United States Patent
Baumgartner et al.

(10) Patent No.: US 8,827,049 B2
(45) Date of Patent: Sep. 9, 2014

(54) MULTI-DISC BRAKE

(75) Inventors: Johann Baumgartner, Moosburg (DE); Aleksandar Pericevic, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 266 days.

(21) Appl. No.: 13/277,342

(22) Filed: Oct. 20, 2011

(65) Prior Publication Data

US 2012/0073910 A1    Mar. 29, 2012

Related U.S. Application Data

(63) Continuation of application No. PCT/EP2010/002341, filed on Apr. 16, 2010.

(30) Foreign Application Priority Data

Apr. 21, 2009  (DE) .......................... 10 2009 018 224

(51) Int. Cl.
*F16D 55/36* (2006.01)
*F16H 3/72* (2006.01)

(52) U.S. Cl.
USPC .......................... 188/71.5; 188/72.9; 188/73.1

(58) Field of Classification Search
USPC ............ 188/71.5, 72.7, 72.9, 73.1; 475/8, 43, 475/67; 192/215, 217.7
See application file for complete search history.

(56) References Cited

U.S. PATENT DOCUMENTS

| | | | |
|---|---|---|---|
| 2,953,040 A * | 9/1960 | Christenson et al. | 475/159 |
| 5,152,724 A * | 10/1992 | Scheiber et al. | 475/159 |
| 5,307,905 A | 5/1994 | Hall, III et al. | |
| 5,927,455 A | 7/1999 | Bieker et al. | |
| 6,170,243 B1 | 1/2001 | Hauser | |
| 2002/0045510 A1 * | 4/2002 | Damm et al. | 475/83 |
| 2006/0180411 A1 | 8/2006 | Banks et al. | |
| 2011/0005870 A1 | 1/2011 | Baumgartner et al. | |

FOREIGN PATENT DOCUMENTS

| | | |
|---|---|---|
| DE | 92 06 052.8 U1 | 10/1993 |
| DE | 43 12 524 A1 | 10/1994 |
| DE | 195 15 063 C1 | 2/1997 |
| DE | 200 18 338 U1 | 3/2001 |
| DE | 10 2008 005 434 A1 | 7/2009 |
| EP | 0 694 132 B1 | 1/1996 |
| WO | WO 01/20188 A1 | 3/2001 |
| WO | WO 03/052286 A1 | 6/2003 |

OTHER PUBLICATIONS

International Preliminary Report on Patentability dated Nov. 10, 2011 (seven (7) pages).

(Continued)

*Primary Examiner* — Melody Burch
(74) *Attorney, Agent, or Firm* — Crowell & Moring LLP

(57) ABSTRACT

A multi-disc brake, in particular for a road vehicle, is provided with parallel discs which are arranged at a distance from each other and which are rotationally stable and between which a rotatable disc brake is positioned. The radially extending discs and the brake discs can be pressed against one another during braking, by way of a brake application device, while overcoming a clearance and once the brake is released, the discs are separated from each other thus forming a clearance. For transferring the feed motion during braking, a transmission gearing is connected in a movement-dependent manner to a pivotable brake lever of the brake application device and also actively connected to the brake discs.

13 Claims, 4 Drawing Sheets

(56) References Cited

OTHER PUBLICATIONS

Din 868: "General Terms and Fundamental Quantities for Gearwheels, Gear Pairs and Toothed Gearings", Institute for Standardization, Berlin, Dec. 1976.

International Search Report dated Jul. 2, 2010, with English language translation.
German Office Action dated Feb. 25, 2010, with English language translation.
German Office Action dated Jul. 6, 2010, with English language translation.

* cited by examiner

MULTI-DISC BRAKE

CROSS-REFERENCE TO RELATED APPLICATIONS

This application is a continuation of PCT International Application No. PCT/EP2010/002341, filed Apr. 16, 2010, which claims priority under 35 U.S.C. §119 from German Patent Application No. DE 10 2009 018 224.1, filed Apr. 21, 2009, the entire disclosures of which are herein expressly incorporated by reference.

BACKGROUND AND SUMMARY OF THE INVENTION

The invention relates to a multi-disc brake, in particular for a commercial road vehicle.

A wet multi-disc brake for a road vehicle is described in DE 10 2008 005 434, which is not a prior publication. DE 10 2008 005 434 proposes to reduce the torque losses which occur in this multi-disc brake during free travel by setting an extra-large release clearance, which is brought back to a normal size again when a braking operation is imminent, even before the actual brake actuation begins.

For this purpose, a brake control system is required that detects events which precede the braking operation, e.g. the release of the gas pedal, and thereupon initiates the reduction in the release clearance.

This method is suitable particularly for electromechanically actuated brakes since the electric motor drive is operated with position control, and hence precise setting of the release clearance in both states is possible. With appropriate adaptation of the position to be set, it is also possible at the same time to provide wear compensation, thus ensuring that no further enlargement of the release clearance occurs.

In the case of a pneumatically actuated brake, which is actuated by use of a brake cylinder supplied with compressed air, precise setting of the enlarged release clearance is very difficult. Although a constant release clearance can be maintained with a conventional slack adjuster, even if wear occurs, situation-dependent setting of different release clearances is not possible, especially by mechanical means.

Enlargement of the release clearance in a manner independent of wear is worthwhile especially in the case of a wet multi-disc clutch since the high viscosity of the oil between the friction surfaces of the plates and the brake discs, i.e. the oil in the release gap, causes frictional losses due to the internal friction in the oil, even when the brake is released, leading to a constantly higher braking resistance and correspondingly higher energy consumption in the operation of the vehicle.

These frictional losses give rise to a permanent residual torque that has to be overcome and is, in particular, dependent on the size of the release clearance.

Although attempts have already been made to enlarge this release clearance in order thereby to allow the oil to flow out of the air gap, the release clearance sizes proposed are unacceptable for higher-speed road vehicles.

Moreover, although wet multi-disc brakes are also subject to wear, this wear increases only up to approximately the magnitude of the enlarged release clearance. That is to say, with a desired enlarged release clearance of about 0.4 mm per friction contact in free travel, it will be necessary to allow for a further 0.4 mm enlargement in the release gap per friction contact owing to wear if this wear is not compensated. If no wear compensation is included, it is important to eliminate this enlarged release clearance in the shortest possible time in the event of a braking operation in order to avoid having to allow for a delayed response from the brake.

It is the underlying object of the invention to develop a multi-disc brake of the type in question in such a way that, by way of a simple design, on the one hand a sufficient enlargement of the release clearance is achieved in free travel to avoid an unwanted residual braking effect and, on the other hand, there is no need to allow for an extended response time during a braking operation.

This object is achieved by a multi-disc brake, in particular for a road vehicle, having plates fixed against rotation, which are arranged parallel to and at a distance from each other and between which in each case one rotatable brake disc is positioned, wherein the radially extending plates and brake discs can be pressed against one another during a braking operation, by use of a brake application device, while overcoming a release clearance and, once the brake is released, the plates can be separated from each other, thereby forming a release clearance. A transmission is provided for transmitting the feed motion during a braking operation. The transmission, on the one hand, is connected in a movement-dependent manner to a pivotable brake lever of the brake application device and, on the other hand, is operatively connected to the plates.

By use of the transmission, which, according to the invention, is arranged between the plates and the brake lever, and which engages on the output side on a ramp ring or on a gearwheel connected to the latter during a braking operation, i.e. when the brake lever is actuated, the rotational speed of the ramp ring is multiplied by a certain factor, preferably by about 5, thus ensuring that the release clearance is traversed quickly.

In this arrangement, a one-way clutch braking device is integrated into the transmission in the region of engagement of the brake lever. The braking device disengages the transmission as soon as an application force takes effect at the brake. At this moment, the actuating force introduced via the brake lever is transmitted directly to a pinion, which meshes with the above-mentioned gearwheel of the ramp ring.

The invention makes it possible to eliminate even a very large release clearance with just a small proportion of the total pivoting travel of the brake lever or a small stroke of a brake cylinder acting on the brake lever and, hence, in a very short time.

The transmission is preferably designed as a planetary transmission. The planet wheels of the transmission are supported in an outer ring, in which an output shaft is guided axially. At one end of the transmission the sun wheel engaging in the planet wheels is held in a manner secure against rotation, while the planet wheels engage on the other side in the internal toothing of a braked annulus.

The action of the transmission will be explained by way of the following example:

Number of brake discs: 3
Number of friction contacts: 6
Release clearance per friction contact: 0.4 mm
Total release clearance: 2.4 mm
Transfer constant of the ramp ring: 4.37° per mm (i.e. the ramp ring must be turned by 4.37° in order to eliminate a release clearance of 1 mm)
Ratio of gearwheel/ramp ring to output shaft: 6.5

For the total release clearance given, the required turning angle of the ramp ring is 10.48° and that for the output shaft is 68.1°. With a reduction ratio between the brake lever and the output shaft of 5:1, it is necessary to turn the brake lever by 13.6°. Without the use of the transmission, the 68.1° pivoting angle calculated above would be required for the brake lever.

DETAILED DESCRIPTION OF THE DRAWINGS

Figure 1:
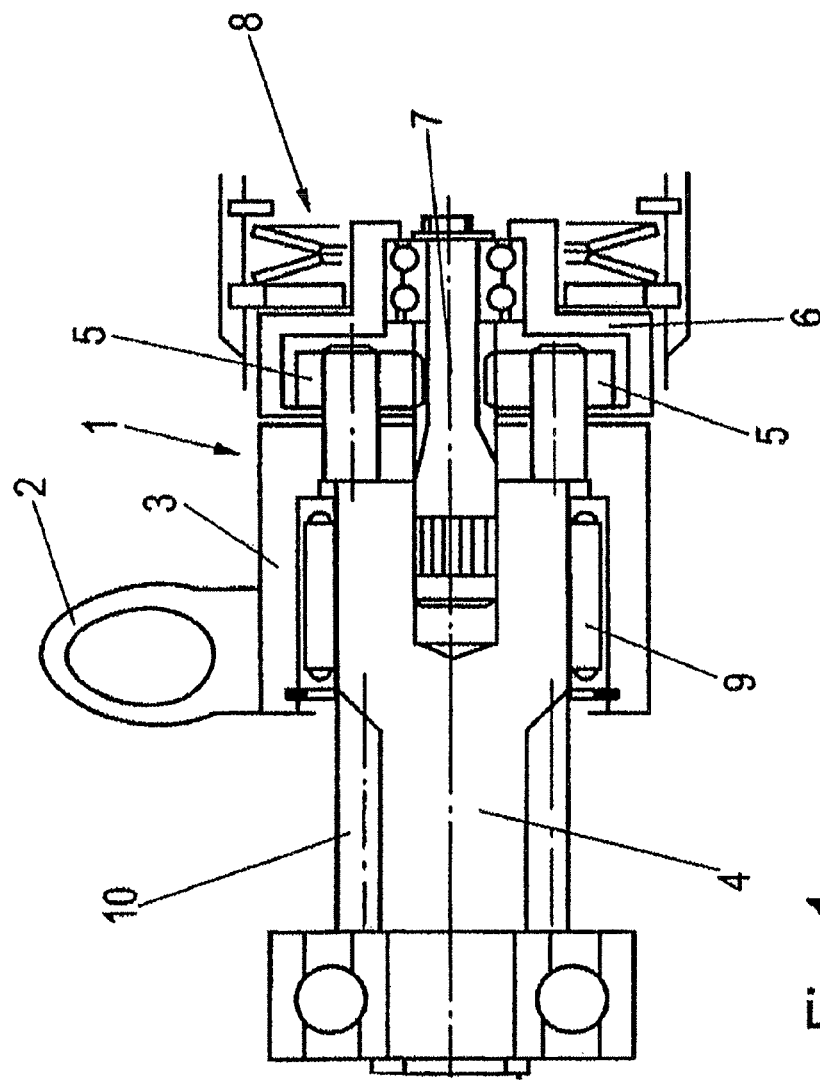
FIG. 1 is a partial view of a multi-disc brake in a sectioned side view.

FIG. 1 shows a partial view of a transmission 1 for transmitting application forces in a multi-disc brake, which has plates fixed against rotation that are arranged parallel to and at a distance from one another and between which, in each case, one rotatable brake disc is positioned.

The transmission 1 is designed as a planetary transmission and has an outer ring 3, on which a brake lever 2 is rigidly mounted.

Supported concentrically and rotatably in the outer ring 3 are planet wheels 5, which engage in a central sun wheel 7, which is connected to an output shaft 4 in a manner fixed against rotation.

On the other side, the planet wheels 5 mesh with the internal toothing of an annulus 6, which is held in a manner secure against rotation within a certain torque range by way of a holding device in the form of a holding brake 8.

Arranged on the opposite end of the output shaft 4 is a pinion 10, which is in engagement with a gearwheel of a ramp ring, by which the plates can be pressed against the brake discs. The gearwheel of the ramp ring, the plates, and a brake disc are known components and are only shown in block diagram form in FIG. 1.

Figure 2:
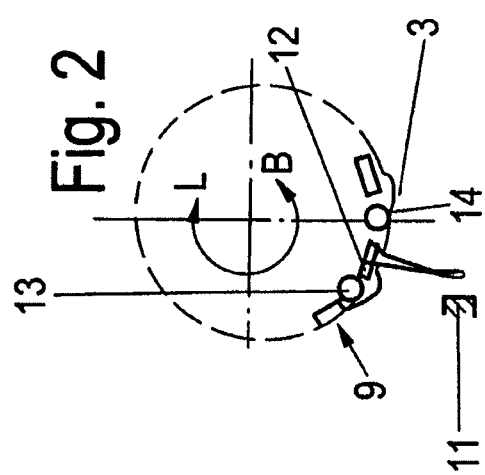
FIG. 2 shows a detail of the multi-disc brake in a schematic front view.
Figure 3:
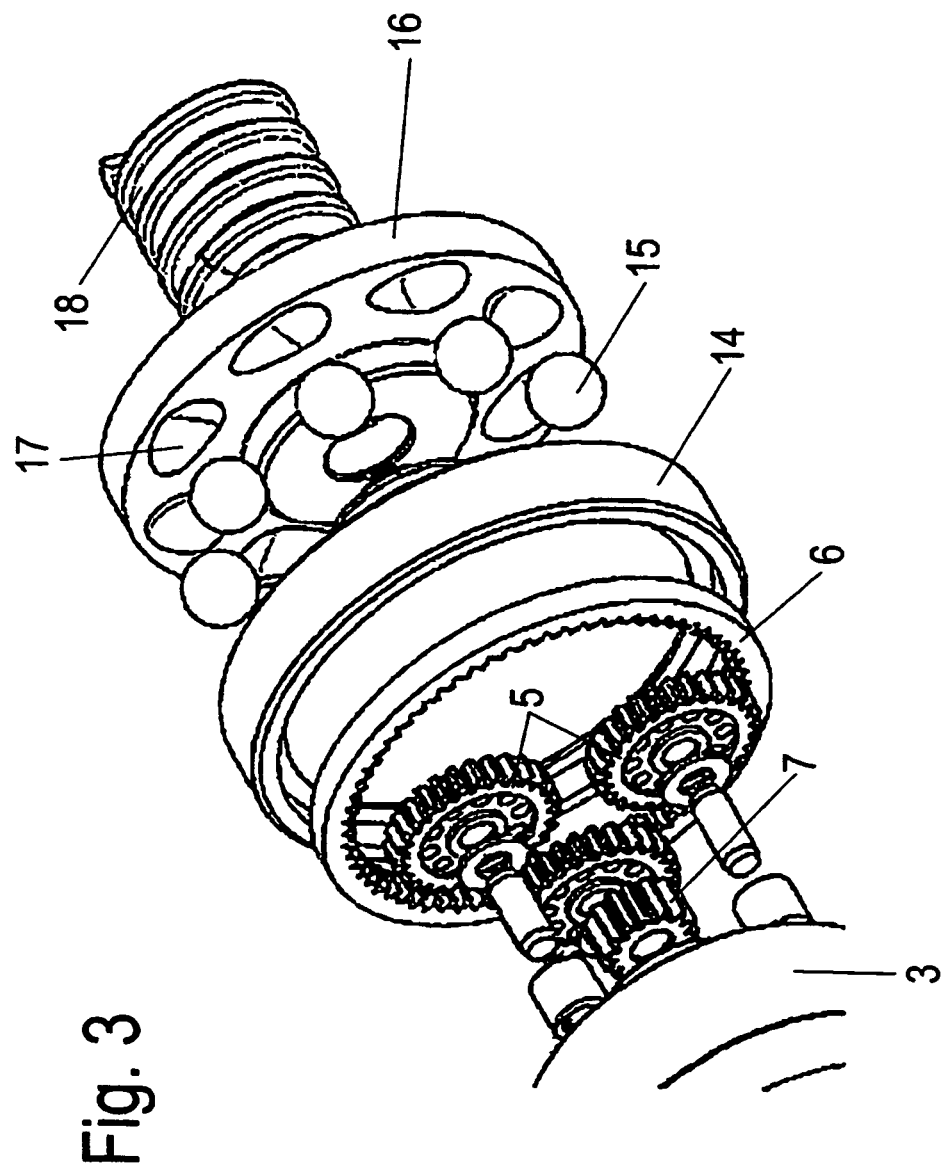
FIG. 3 shows another detail of the multi-disc brake in an exploded representation.
Figure 4:
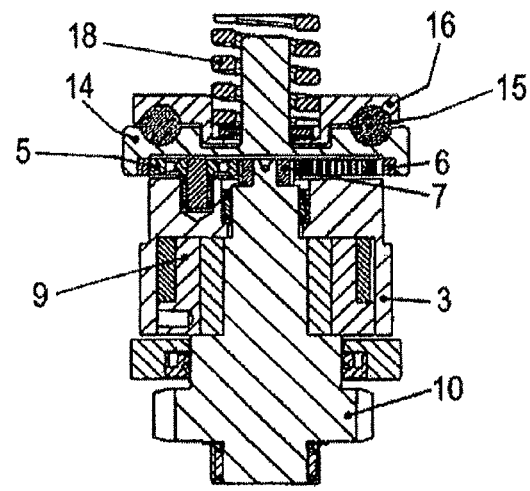
FIG. 4 shows the detail according to FIG. 3 in a longitudinal section.
Figure 5A:
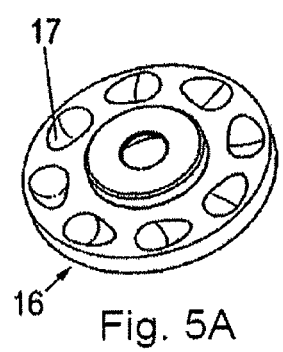
FIG. 5A shows a single component according to FIG. 4 in perspective view.
Figure 5B:
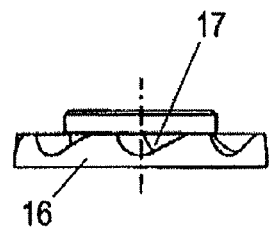
FIG. 5B shows a single component according to FIG. 4 in side view.

The outer ring 3 is supported pivotably on the output shaft 4 by way of a one-way clutch braking device 9. The one-way clutch braking device 9 has a multiplicity of rolling elements 13, which are held in a rolling element cage 12, as shown in FIG. 2.

When the brake lever 2 is actuated, the outer ring 3 is turned, and the rotary motion is transmitted to the output shaft 4 through the transmission 1.

During this process, the planet wheels 5 are driven by the outer ring 3, and the output shaft 4 is turned accordingly through engagement in the sun wheel 7. The transmission 1 has a transmission ratio which ensures that the output shaft 4 is turned more quickly than the outer ring 3, more specifically in the non-locking direction of the one-way clutch braking device 9, as it were under the outer ring 3.

As mentioned, the output shaft 4 actuates the ramp ring via the pinion 10, thereby pressing an actuating ring (likewise not shown) against a first plate, which is held fixed against rotation and which, by displacement, eliminates the release clearance at all the frictional contact surfaces.

In the region of the release clearance, the only counterforce to be overcome is the force of return springs, which are arranged between the individual plates.

As soon as all the friction surfaces of the plates have been brought into contact with the associated brake discs, the application force starts to build up.

The output torque to be transmitted then also rises to such an extent that the holding force of the holding brake 8 acting on the annulus 6, which is subject to a defined limit, is overcome and the annulus slips.

In this position, the one-way clutch braking device 9 engages, with the result that the output shaft 4 is driven to further increase the application force directly by the brake lever 2, via the outer ring 3, through the clamping action of the one-way clutch braking device 9.

If the actuating pressure in a brake cylinder acting on the brake lever 2 decreases, the plates are released and the brake lever 2 is moved back by the output shaft 4.

Here, the transmission of the return motion to the brake lever 2 takes place directly since the one-way clutch braking device 9 acts in its wedging direction during this return motion.

When a state free from the application force is reached, the force of the return spring of the plates continues to act, pivoting the brake lever 2 further back.

Since the transmission 1 is not activated in this position, only a very small release clearance would be set when the starting position of the brake lever 2 was reached or, in the case of severe wear, the brake would not be fully released.

It is therefore necessary to activate the transmission 1 by canceling the wedging action of the one-way clutch braking device 9. This is accomplished by the fact that the cage 12 guiding the rolling elements 13 of the one-way clutch braking device 9 is hindered from rotating further by a stop 11 just before the starting position of the brake lever 2 is reached, and, at the same time, the rolling elements 13 are moved out of their wedging position, down ramps 17.

In this position, there can be no direct transmission of power from the output shaft 4 to the outer ring 3 and, as a result, the rotary motion of the output shaft 4 is transmitted via the transmission 1, and the brake lever 2 is moved back fully into its starting position.

Depending on the state of wear of the friction surfaces of the plates and of the brake discs, the ramp ring may not yet have reached its starting position. For this purpose, the reaction torque acting on the annulus 6 must be great enough to turn the annulus 6 against the effective holding force of the holding brake 8.

For this purpose, it is necessary that the braking force of the holding brake 8 should be lower in the reverse direction of rotation than in the forward direction of rotation. This is achieved by designing the holding brake 8 to be self-energizing in one direction, e.g. in the form of a spring-loaded band brake, a duo- or servo-drum brake or a disc brake fitted with energizing ramps. By way of the holding brake 8 designed in this way, the lower holding force acting on the annulus 6 in the direction of return rotation is overcome without problems, and the ramp ring is moved back fully into its starting position by the force of the return spring.

Instead of being designed as a holding brake 8, the holding device can be designed in the form of a ball ramp clutch, which, in contrast to a friction brake, operates virtually without wear.

A holding device of this kind is illustrated in FIGS. 3 to 5B. The holding device consists essentially of two ramp discs 14, 16, between which balls 15 are supported, with the annulus 6 of the transmission 1 being held on ramp disc 14 in a manner secure against rotation on the opposite side from the balls 15.

When the brake lever 2 (FIG. 1) connected to the outer ring 3 is pivoted in order to apply the brake, the planet wheels 5 are driven. The annulus 6 is supported via the balls 15 on ramp disc 16, which is preloaded axially by a compression spring 18 and is held in a housing (not shown) in a manner which prevents rotation but allows axial movement. The result is that the pressure force of the spring 18 and the inclination of ramps 17 FIGS. 5A and 5B) results in a limiting torque which has to be applied in order to turn the ramp disc 14 together with the annulus 6.

Once this torque is exceeded, i.e. once the release clearance of the brake has been eliminated, the drive output from the brake lever 2 takes place directly via the one-way clutch braking device 9. In the process, the ramp disc 14 turns and the balls 2 move along the ramps 17.

This movement leads to an axial movement of ramp disc 16, thereby imposing an additional load on the compression spring 18. Admittedly, this would lead to an increase in the limiting torque.

To prevent this, the ramps 17 are designed in such a way that the angle of inclination decreases with the rotation of the balls 15. This ensures that the limiting torque remains virtually constant.

The length of the ramps 17 is determined by the stiffness of the braking mechanism and hence the pivoting travel of the brake lever 2 required to build up the braking force.

Return of the annulus 6 when the brakes are released takes place automatically by way of the preloaded compression spring 18.

| Table of Reference Numerals | |
|---|---|
| 1 | transmission |
| 2 | brake lever |
| 3 | outer ring |
| 4 | output shaft |
| 5 | planet wheels |
| 6 | annulus |
| 7 | sun wheel |
| 8 | holding brake |
| 9 | one-way clutch braking device |
| 10 | pinion |
| 11 | stop |
| 12 | rolling element cage |
| 13 | rolling elements |
| 14 | ramp disc |
| 15 | ball |
| 16 | ramp disc |
| 17 | ramp |
| 18 | compression spring |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A multi-disc brake for a road vehicle, comprising:
   plates arranged non-rotatably parallel to and spaced apart from one another;
   rotatable brake discs, each one of which is respectively positioned between adjacent ones of the plates, wherein the plates, which extend radially, and the brake discs are pressable against one another during a braking operation, via a brake application device having a pivotable brake lever, while overcoming a release clearance and, are separable from one another to again form a release clearance upon release of the braking operation;
   a transmission operatively configured for transmitting a feed motion during the braking operation;
   an output shaft;
   an outer ring supported on the output shaft;
   a pinion provided on an end of the output shaft remote from the transmission, the pinion being operatively configured to engage in a gearwheel by which a ramp ring is pressable against an associated one of the plates;
   wherein
   at one end the transmission is operatively coupled in a movement dependent manner to the pivotable brake lever and at the other end to the non-rotatable plates, and
   the brake lever is attached to the outer ring.

2. The multi-disc brake according to claim 1, further comprising a one-way clutch braking device operatively arranged between the outer ring and the output shaft.

3. The multi-disc brake according to claim 1, wherein the transmission is operatively configured as a planetary transmission.

4. The multi-disc brake according to claim 3, wherein the planetary transmission comprises:
   concentrically arranged planet wheels rotatably supported on the outer ring; and
   a central sun wheel coupled to the output shaft, said planet wheels being in engagement with the sun wheel.

5. The multi-disc brake according to claim 4, further comprising:
   an annulus having an internal toothing; and
   wherein the planet wheels mesh with the internal toothing.

6. The multi-disc brake according to claim 5, further comprising:
   a holding device in which the annulus is held in a torque-dependent manner.

7. The multi-disc brake according to claim 2, wherein the one-way clutch braking device comprises a one-way clutch cage in which rolling elements are held, said cage being operatively configured to abut against a stop on the outer ring after rotating through a defined pivot angle.

8. The multi-disc brake according to claim 6, wherein a holding force of the holding device during pivoting of the brake lever is greater in a brake application direction than in a release direction.

9. The multi-disc brake according to claim 8, wherein the holding device is operatively configured to self-energize in one of said directions.

10. The multi-disc brake according to claim 8, wherein the holding device is a holding brake.

11. The multi-disc brake according to claim 10, wherein the holding brake is operatively configured as one of a spring-loaded band brake, a duo- or servo-drum brake, and a disc brake equipped with self-energizing ramps.

12. The multi-disc brake according to claim 6, wherein the holding device is operatively configured as a ball ramp clutch; and
   wherein the ball ramp clutch comprises two ramp discs turnable relative to one another, at least one of the two ramp discs comprises ramps in which the balls are rollably positioned, the balls being supported on another side on the other of the two ramp discs.

13. The multi-disc brake according to claim 12, wherein an angle of inclination of the ramps decreases as a length of the ramps increases.

* * * * *